United States Patent
Baumann et al.

(10) Patent No.: US 11,933,413 B2
(45) Date of Patent: Mar. 19, 2024

(54) SUPPORT STRUCTURE FOR A REVERSE BUCKLING RUPTURE DISC

(71) Applicants: Oseco Inc., Broken Arrow, OK (US); Elfab Ltd., North Shields (GB)

(72) Inventors: Brad Baumann, Bixby, OK (US); Chris Snell, Broken Arrow, OK (US); Hunter Franks, Jenks, OK (US); Jason Garoutte, Haskell, OK (US); Rion Rogers, Tulsa, OK (US)

(73) Assignees: Oseco Inc., Broken Arrow, OK (US); Elfab Ltd., North Shields (GB)

( * ) Notice: Subject to any disclaimer, the term of this patent is extended or adjusted under 35 U.S.C. 154(b) by 0 days.

(21) Appl. No.: 17/814,959

(22) Filed: Jul. 26, 2022

(65) Prior Publication Data

US 2024/0035582 A1 Feb. 1, 2024

(51) Int. Cl.
*F16K 17/16* (2006.01)

(52) U.S. Cl.
CPC .......... *F16K 17/1606* (2013.01); *F16K 17/16* (2013.01); *F16K 17/162* (2013.01); *F16K 17/1633* (2013.01)

(58) Field of Classification Search
CPC .... F16K 17/1606; F16K 17/16; F16K 17/162; F16K 17/1633
USPC ... 137/68.19, 68.26, 68.28, 69, 68.23, 68.21
See application file for complete search history.

(56) References Cited

U.S. PATENT DOCUMENTS

| | | | | |
|---|---|---|---|---|
| 4,269,214 | A | * | 5/1981 | Forsythe ............. F16K 17/1613 137/68.28 |
| 5,167,337 | A | * | 12/1992 | Short, III ............ F16K 17/1606 220/89.2 |
| 5,305,775 | A | * | 4/1994 | Farwell ................. F16K 17/162 137/68.21 |
| 6,006,938 | A | * | 12/1999 | Mozley ............... F16K 17/1606 220/89.2 |
| 6,178,983 | B1 | * | 1/2001 | Culliinane .......... F16K 17/1606 220/89.2 |
| 6,431,196 | B1 | * | 8/2002 | Brazier ................... F16K 17/16 137/71 |
| 6,446,653 | B2 | * | 9/2002 | Cullinane ........... F16K 17/1606 137/68.27 |
| 7,878,215 | B2 | * | 2/2011 | McLelland ......... F16K 17/1613 137/68.13 |
| 8,387,647 | B1 | * | 3/2013 | Wilson ................ F16K 17/1606 137/68.26 |
| 9,453,582 | B2 | * | 9/2016 | Goggin ............... F16K 17/1613 |
| 2011/0303523 | A1 | * | 12/2011 | Walker ................ F16K 17/1606 137/68.19 |
| 2017/0130853 | A1 | * | 5/2017 | Wilson ............... B23K 15/0006 |

OTHER PUBLICATIONS

PCT International Application No. PCT/US23/69882, International Search Report and Written Opinion of the International Searching Authority, dated Aug. 9, 2023, 7 pages.

* cited by examiner

*Primary Examiner* — Minh Q Le
(74) *Attorney, Agent, or Firm* — DLA PIPER LLP (US)

(57) ABSTRACT

A knuckle and support structure for a reverse buckling rupture disc is described.

16 Claims, 13 Drawing Sheets

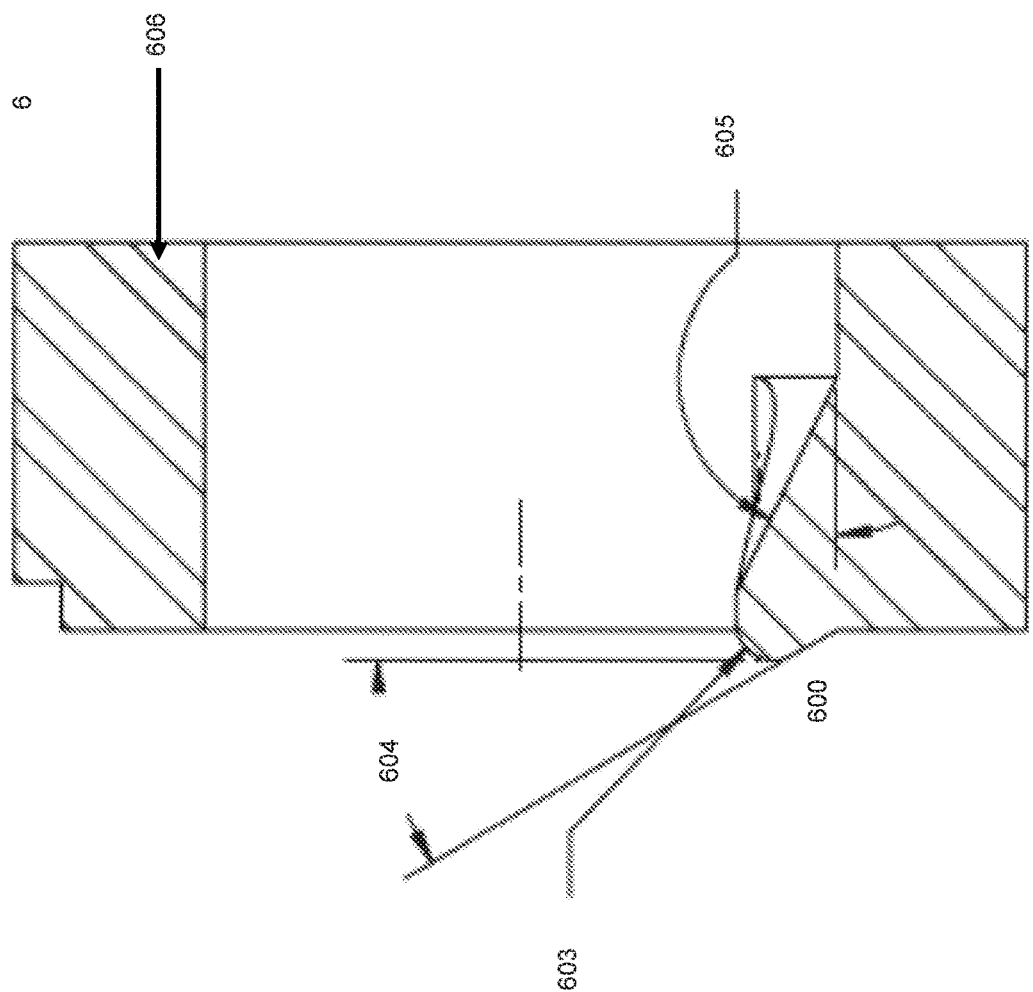

SUPPORT STRUCTURE FOR A REVERSE BUCKLING RUPTURE DISC

BACKGROUND OF THE DISCLOSURE

Reverse buckling rupture discs are generally used in various applications that involve medium and high pressures, high operating temperatures, and with considerable pressure fluctuations, such as chemical processing plant processes, refineries, pharmaceutical manufacturing, petroleum-based processes, and others. Reverse buckling rupture discs utilize a dome whose convex side faces the process media/pressure direction. When the pressure level reaches a sufficient level (i.e., the "burst pressure"), an instability is created in the dome resulting in reversal (i.e., buckling) of the dome and thus a release of the pressure. The buckling occurs along a scoring of the disc. These components are often used pressure-relief safety devices.

SUMMARY OF THE DISCLOSURE

According to one aspect of the present disclosure, a rupture disc assembly can include an inlet body; and an outlet body in contact with the inlet body and forming a throughbore with an inner diameter. The outlet body can include a first plane in contact with the inlet body and a second plane opposite the first plane. The assembly can further include a rupture disc residing within and sealing the throughbore; and a knuckle on the outlet body residing within the throughbore, protruding past the first plane toward the rupture disc, and configured to catch the rupture disc upon activation. The knuckle can include a crown with a crown radius facing the throughbore and a curved wing on each side of the crown. A backside of the knuckle can reduce from the inner diameter at a draft angle In some embodiments, the inlet body, the outlet body, and the rupture disc can be separate pieces. In some embodiments, the inlet body and the rupture disc can be welded together. In some embodiments, the inlet body, the outlet body, and the rupture disc can be welded into a single unit. In some embodiments, the crown radius is proportional to the inner diameter of the throughbore. In some embodiments, a ratio of the crown radius to the inner diameter can be approximately 1:0.90 to 1:1.10.

In some embodiments, each curved wing can include a wing radius. In some embodiments, the knuckle can include a nose radius perpendicular to the crown radius. In some embodiments, the knuckle can protrude past the first plane according to a nose angle proportional to a height of the crown. In some embodiments, the nose angle can be proportional to the height of the crown at a ratio of about 1:2. In some embodiments, the draft angle is proportional to a height of the crown. In some embodiments, the wings can be configured to cause the rupture disc to curl into a shape of the throughbore prior to colliding with the backside of the knuckle.

According to another aspect of the present disclosure, a rupture disc assembly can include an inlet body and an outlet body in contact with the inlet body and forming a throughbore with an inner diameter. The outlet body can include a first plane in contact with the inlet body and a second plane opposite the first plane. The assembly can further include a rupture disc residing within and sealing the throughbore, wherein the inlet body and the rupture disc can be welded together to form a single piece. In some embodiments, the assembly can include a knuckle on the outlet body residing within the throughbore, protruding past the first plane toward the rupture disc, and configured to catch the rupture disc upon activation. In some embodiments, the knuckled can include a crown with a crown radius facing the throughbore and a curved wing on each side of the crown. The backside of the knuckle can reduce from the inner diameter at a draft angle. In some embodiments, the crown radius is proportional to the inner diameter of the throughbore.

According to another aspect of the present disclosure, a rupture disc assembly can include an inlet body and an outlet body in contact with the inlet body and forming a throughbore with an inner diameter. The outlet body can include a first plane in contact with the inlet body and a second plane opposite the first plane. The outlet body can include an asymmetric keyed extension. The assembly can include a rupture disc residing within and sealing the throughbore. In some embodiments, the assembly can include a knuckle on the outlet body residing within the throughbore, protruding past the first plane toward the rupture disc, and configured to catch the rupture disc upon activation. In some embodiments, the knuckle can include a crown with a crown radius facing the throughbore and a curved wing on each side of the crown. A backside of the knuckle can reduce from the inner diameter at a draft angle. In some embodiments, wherein the crown radius can be proportional to the inner diameter of the throughbore.

BRIEF DESCRIPTION OF THE FIGURES

FIG. 6B shows a side view of a knuckle rupture disc assembly according to some embodiments of the present disclosure.

DESCRIPTION

The following detailed description is merely exemplary in nature and is not intended to limit the claimed invention or the applications of its use. Moreover, while the disclosed embodiments may be described in reference to use with a tax preparation service, it should be appreciated that the disclosed principles may apply to any service requiring the input and analysis of form fields.

Embodiments of the present disclosure thus relate to a support structure for a reverse buckling rupture disc that both prevents fragmentation and lowers flow resistance after activation of the rupture disc. In some embodiments, the support structure includes a knuckle that can be machined integral to the rupture disc holder with such a design that simultaneously causes the catching (and therefore preventing fragmentation) of the rupture disc and lowering of the Kr value of the assembly. Such a lowering of the Kr value is advantageous as too much resistance in the line can cause various issues associated with over-pressurization and damage to equipment.

Figure 1:
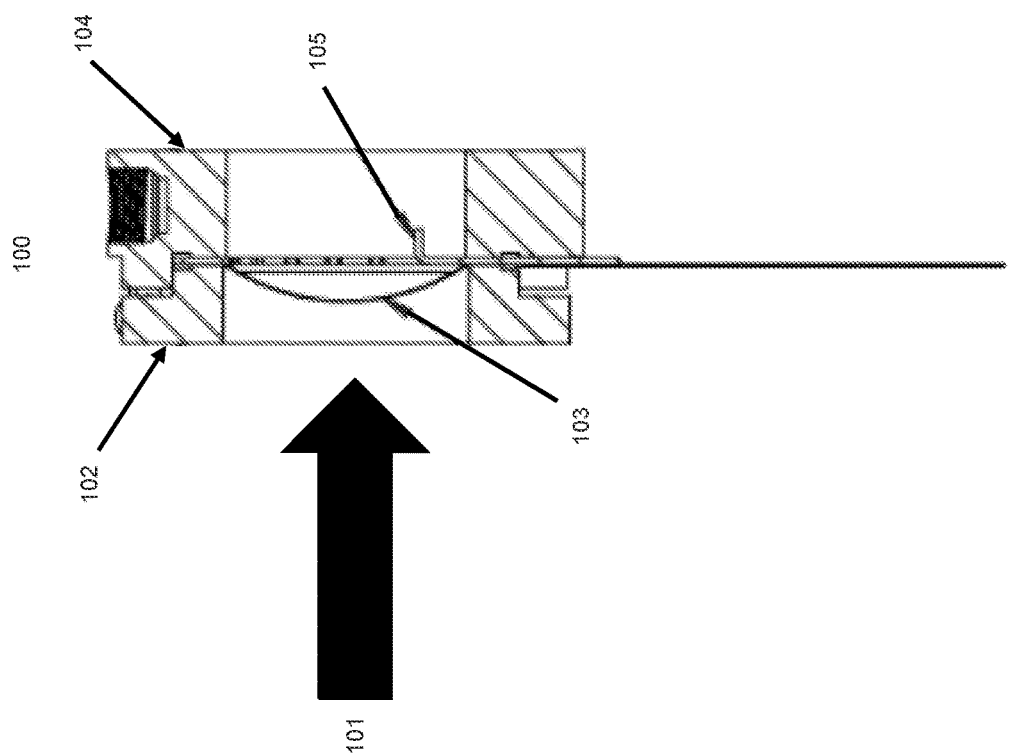
FIG. 1 shows a conventional rupture disc assembly with a paddle.

An example of a conventional rupture disc assembly 100 is shown in FIG. 1. The assembly 100 includes an inlet 102, a rupture disc 103, and an outlet 104. The inlet 102 and the outlet 104, when together, form a throughbore (i.e., a cylindrical hole or channel through the inlet and outlet). The rupture disc 103 resides within the throughbore, preventing leakage from a flow 101 through the outlet until after activation. The inlet 102 can be made from any number of metal alloys and is desired to support and stabilize the inlet flange of the rupture disc 103. In some embodiments, the inlet 102 can include some form of sealing mechanisms to prevent media from escaping while under pressure. Such a mechanism is typically a metal-to-metal seal that comes in various designs. The outlet 104 can also be made from any number of metal alloys and supports and stabilizes the outlet flange of the rupture disc 103. In some embodiments, the inlet 102 and the outlet 104 together can be referred to as a support structure. The rupture disc 103 can be made from any number of metal alloys or plastics and includes a membrane (i.e., the dome) that is designed to rupture at a specified burst pressure and temperature. The burst pressure and temperature are specified and can vary by application.

Figure 4:
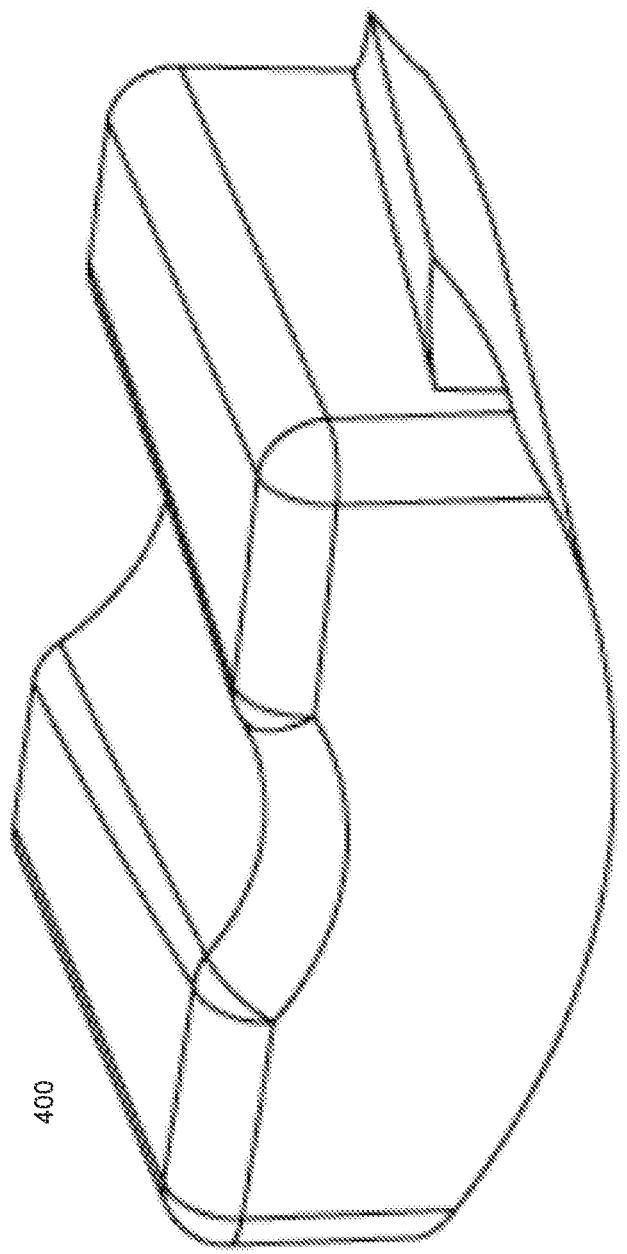
FIG. 4 shows a conventional knuckle.
Figure 5:
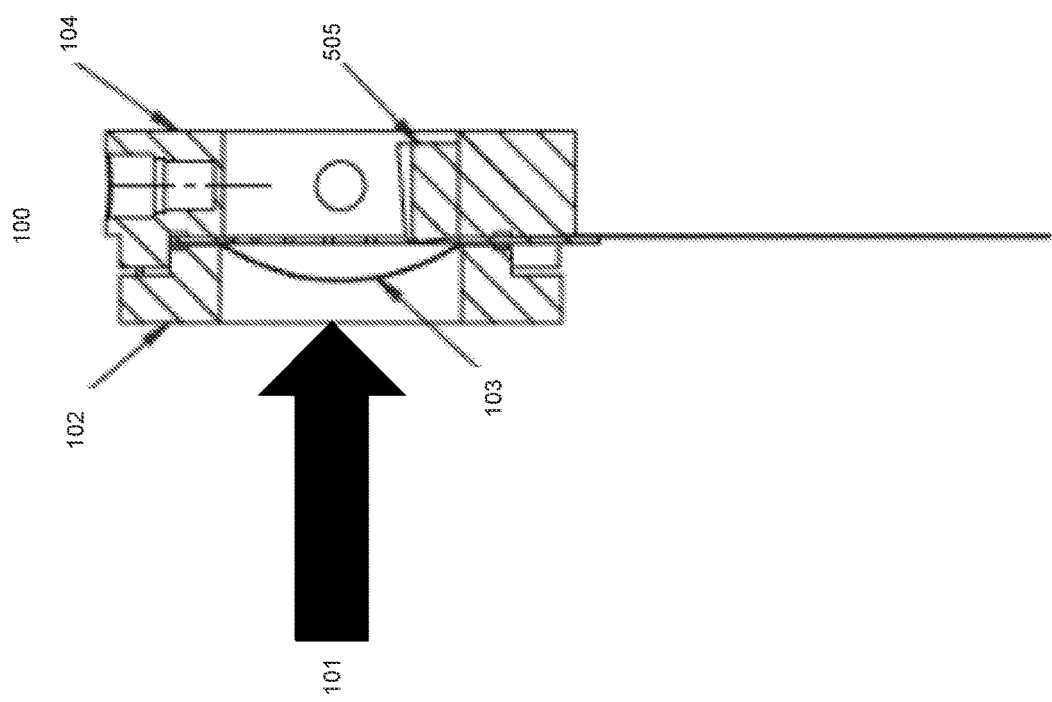
FIG. 5 shows a conventional rupture disc assembly with a knuckle.

The assembly 100 further includes a paddle 105. It is important to note that the paddle 105 could alternatively be replaced with a knuckle (see knuckle 400 of FIG. 4 and knuckle 505 of FIG. 5), both of which can be attached directly to the rupture disc 103 by various bonding methods such as welding or epoxy. The function of paddles and knuckles is generally to catch a reverse buckling rupture disc as it buckles and tears through a predetermined score pattern. Catching the buckling rupture disc prevents fragmentation of the disc and lower flow resistance after its activation.

Knuckles are often formed as a cast or machined metal alloy that is designed to fit within the inlet bore of the outlet of the holder assembly (i.e., outlet 104). Many knuckle designs in the rupture disc market are cast due to the expense of machining complex geometry into a small piece of metal. In addition, many knuckles are cast with a stainless alloy to avoid high expenses of casting exotic metal alloys. Knuckles are typically attached by either a welding process (e.g., GTAW) or an epoxy.

Figure 2:
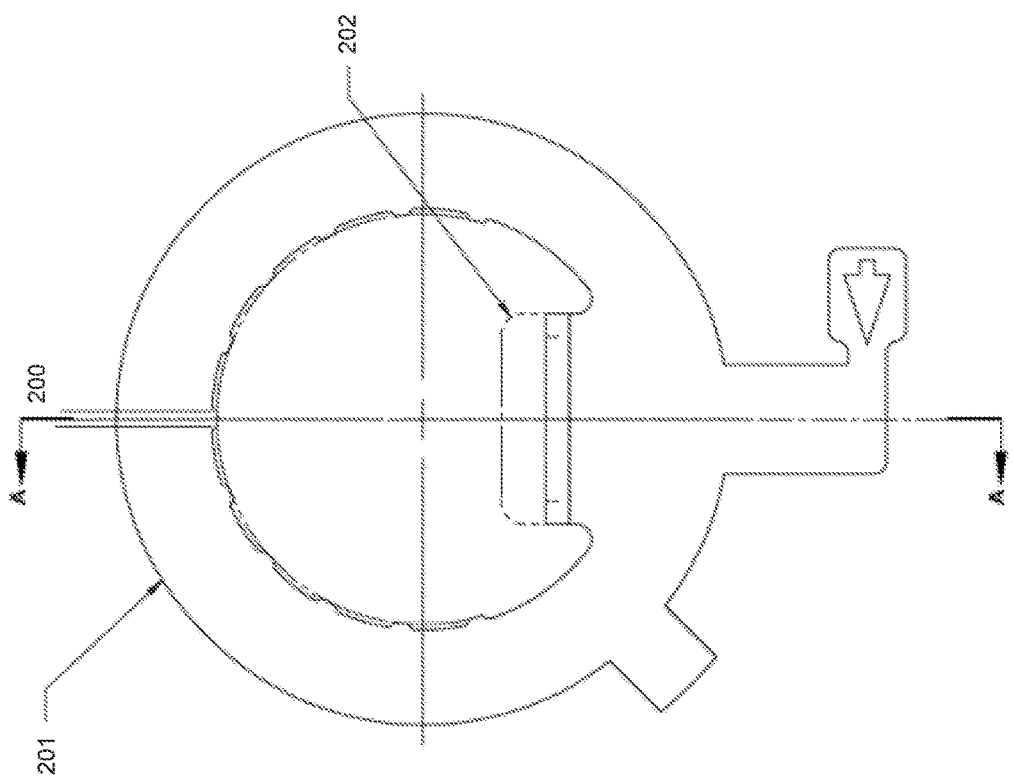
FIG. 2 shows a top view of a conventional reverse buckling rupture disc.
Figure 3:
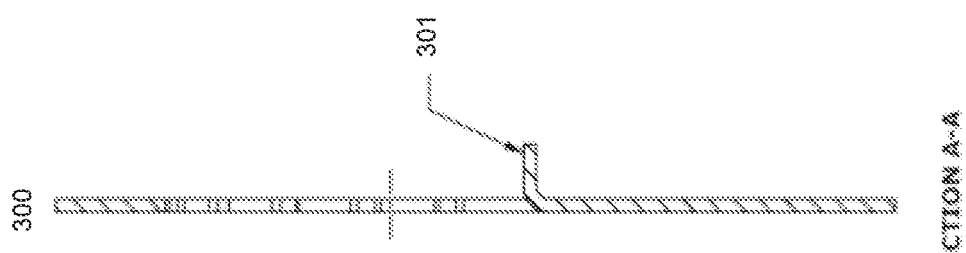
FIG. 3 shows a side view of a conventional reverse buckling rupture disc 300 that includes a bent hinge.

FIG. 2 shows a top view of a conventional reverse buckling rupture disc 200. The rupture disc 200 includes a paddle 201 and a bent hinge 202 designed to catch a buckling rupture disc. FIG. 3 shows a side view of a conventional reverse buckling rupture disc 300 that includes a bent hinge 301.

Sheet metal used for paddles and knuckles is typically stainless alloys but generally can be made from any number of alloys. For low pressure applications, the paddles may be a simple cutout design without any bent material. High pressure designs can typically be bent in such a way to dampen momentum and to avoid sharp edges which may create a tear in the disc material during activation. Many rupture disc applications use a paddle rather than a knuckle due to the low expense of manufacturing. However, paddles are generally not as effective in preventing fragmentation as knuckles due to the difficulty in eliminating all sharp edges.

There are various knuckle designs currently being utilized in the rupture disc market as well as various paddle designs formed out of bent sheet metal. As discussed above, both designs are used to dampen the momentum of a reverse buckling rupture disc upon activation and catch or secure the disc petal to prevent it from tearing and separating from the rupture disc assembly. This is known in the rupture disc market as fragmentation and is typically unacceptable due to the potential damage it can cause. An additional attribute of these designs is their effect on the resistance of flow through the rupture disc assembly. In particular, a Kr value is a unitless value used to describe rupture disc assemblies which represents the resistance to flow or head loss associated with the assembly. Similarly, fitting such as elbows and tees have common Kr values/factors assigned to them in pressure and piping. In general, the most restricted the passage is, the higher the head loss and therefore the higher the Kr value. Minimal head loss or flow resistance in a flowing pressurized system can be advantageous as too much resistance in the line can cause issues associated with over-pressurization and damage to equipment.

Figure 6A:
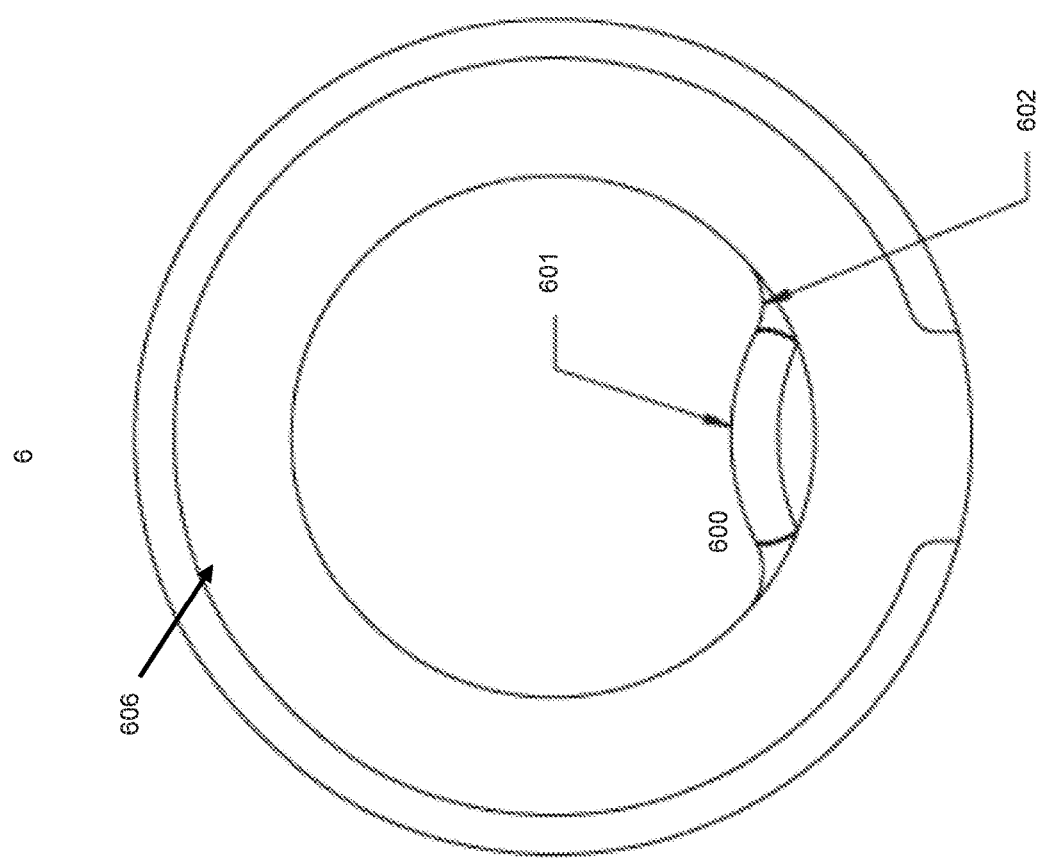
FIG. 6A shows a bottom view of a knuckle rupture disc assembly according to some embodiments of the present disclosure.

FIG. 6A shows a top view of a knuckle rupture disc assembly 6 according to some embodiments of the present disclosure. The assembly 6 includes an outlet holder 606, and a knuckle 600. The knuckle 600 can include a crown 601 that has an associated crown radius. The crown radius describes the upper profile of the knuckle 600 while facing from the front/top view. The crown radius can also describe the overall height of the knuckle and can play an important part in preventing fragmentation by helping the rupture disc curl toward the inner diameter of the outlet holder 606. In some embodiments, if the radius of the crown 601 is not large enough (and therefore the knuckle 600 is not tall enough), the knuckle 600 may not dampen the momentum of the rupture disc enough to prevent it from tearing free. In some embodiments, the ratio of the radius of the crown 601 to the inner diameter of the outlet holder 606 may be approximately 1:1+/−10%.

The knuckle 600 can also include a wing 602. There may be a wing 602 on either side of the knuckle 600. Each wing 602 can be curved or can have an associated wing radius, which is the radius that describes the connection between the crown 601 and the inner diameter of the outlet holder 606. After the rupture disc buckles, it strikes the nose radius 603 (see FIG. 6B) and inverts as it lays over the crown 601. The wing radius can support the outer edges of the rupture disc to fold outward and match the curvature and profile of the outlet holder 606, which can prevent curled or rough edges. Therefore, the radius of the wing 602 can help prevent fragmentation by eliminating sharp changes in geometry of the rupture disc. In some embodiments, the wing 602 can cause the inverted dome of the rupture disc to curl into the shape of the inner diameter of the pipe or outlet holder 606 prior to hitting the draft angle 605.

FIG. 6B shows a side view of a knuckle rupture disc assembly 6 according to some embodiments of the present disclosure. The side view of assembly 6 illustrates the knuckle 600 in between an inlet and the outlet holder 606. The knuckle 600 can be further defined by a nose radius 603, which describes the cross-sectional profile view of the knuckle 600 and can be perpendicular to the crown radius. In addition, the knuckle 600 can further be defined by a nose angle 604, which is an angle, viewed two-dimensionally, that describes the distance the knuckle 600 protrudes from the face of the outlet holder 606. In some embodiments, when viewed three-dimensionally, the nose angle 604 can be a conical angle, which helps shape the rupture disc as it activates. The knuckle 600 can protrude toward the concavity side of a rupture disc (not shown) past the plane of the outlet holder 606. In some embodiments, such a protrusion can assist with dampening the momentum of a buckling rupture disc quickly rather than allowing it to roll through the opening, especially with larger rupture discs. In some embodiments, the nose angle 604 can be defined as a certain ratio of the average height of the crown 601 vs. the unmachined cone height, which can be approximately 1:2.

Figure 6C:
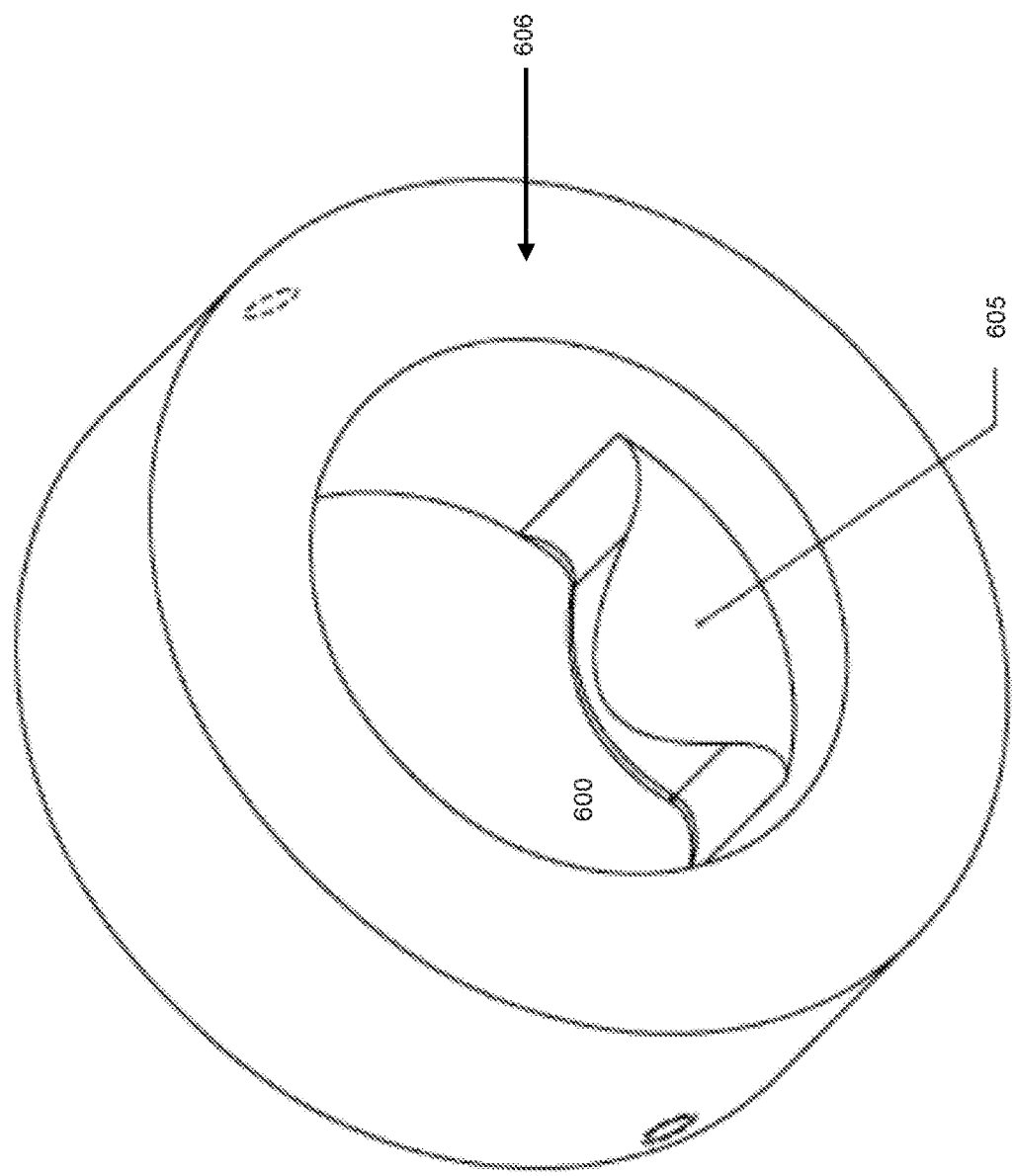
FIG. 6C shows a perspective view of a knuckle rupture disc assembly according to some embodiments of the present disclosure.

FIG. 6C shows a perspective view of a knuckle rupture disc assembly 6 according to some embodiments of the present disclosure. The perspective view illustrates the knuckle 600 within the outlet holder 606. In some embodiments, the knuckle 600 can include a draft angle 605, which can describe the angle on the backside (which is inside the throughbore) of the knuckle 600 that reduces from the inner diameter of the outlet holder 606 through the body of the knuckle 600 without creating a sharp change in geometry. In some embodiments, the draft angle 605 can be proportional to the height of the radius of the crown 601. In addition, the draft angle 605 can support the rupture disc in its final stage of activation upon the knuckle 600 and can imprint the angle geometry on the disc, which can aid in a reduction of flow resistance.

In some embodiments, the disclosed knuckle 600 can be machined into the outlet holder 606; generally conventional knuckles are cast into a holder. The disclosed design of the knuckle 600 can allow for smooth geometry transitions between the knuckle 600 and the outlet holder 606, mitigating head loss across the knuckle 600. Generally, cast and welded knuckles have abrupt geometries due to minimal thickness constraints of cast parts, as well as the rough transition points along a weld bead.

Furthermore, exotic materials for the outlet holder 606 can now have a matching knuckle. Cast knuckles are typically made from stainless material as casting in exotic alloys is expensive. This is in addition to the overhead cost of ordering high quantity minimum orders in an exotic alloy. Also, uniformity and flexibility in materials can be advantageous as certain applications may not be able to tolerate stainless materials.

In some embodiments, the draft angle 605 can provide various advantages such as reducing the head loss and the flow resistance factor by creating a gradual expansion across the knuckle 600 which ends flush with the inner diameter of the outlet holder 606. In addition, the draft angle 605 can reduce the springing back of the disc after it fully wraps the knuckle 600 by imprinting the draft angle 605 design into the material. This can allow the disc to sit firmly against the bore diameter, reducing head loss.

Figure 11:
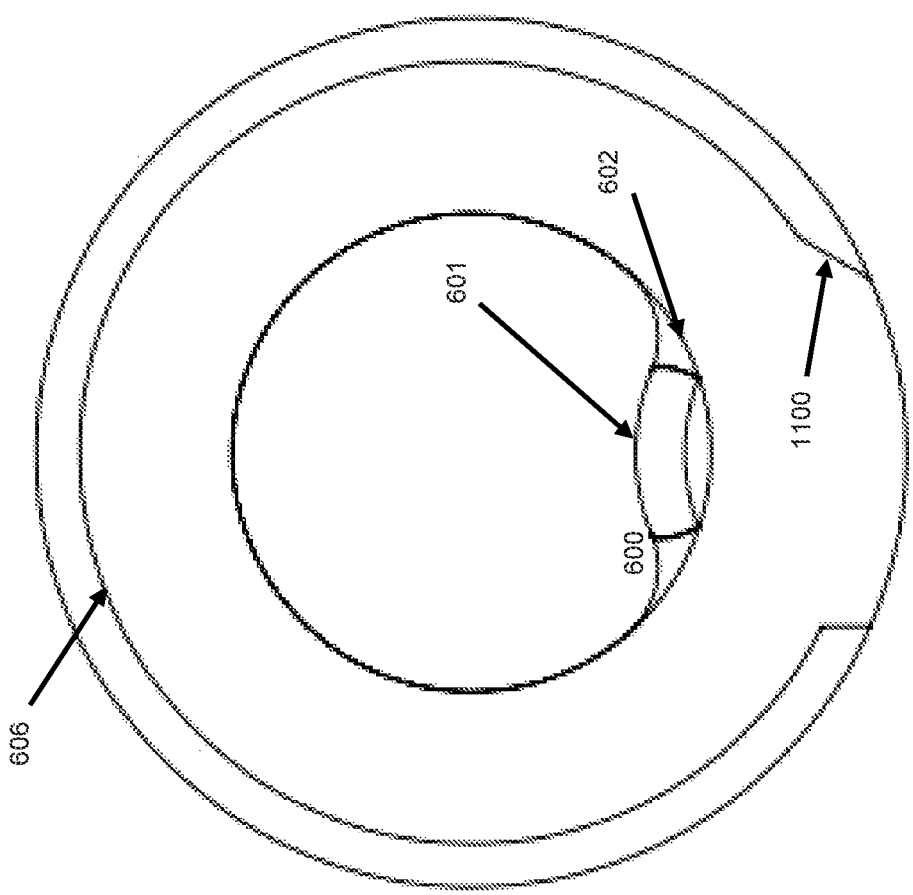
FIG. 11 shows a top view of another knuckle rupture disc assembly according to some embodiments of the present disclosure.

In some embodiments, the holder 606 can include an asymmetric keyed extension coming off the cutter, which can take the form of an asymmetric angle of a tag slot integrated into the holder 606, helping eliminate the possibility of installing the disc backwards. This is shown in FIG. 11, which includes an assembly 6 with an asymmetric keyed extension 1100.

In some embodiments, the disclosed knuckle 600 can integrate with a two-piece rupture disc assembly. The assembly can include a welded two-piece design, where the inlet body and the rupture disc are welded together to form one piece and the outlet body forms the second piece. This assembly can assist with reducing leakage and hazardous emissions on the inlet side. In other embodiments, the two-piece rupture disc assembly can exist without the presence of a knuckle, which can also provide a decreased Kr value.

In some embodiments, the disclosed knuckle 600 can also integrate with a one-piece assembly that has a replaceable welded assembly disc inlet. In a one-piece assembly, the inlet, outlet, and rupture disk are welded together to form a single piece.

In some embodiments, the disclosed knuckle 600 can integrate with a three-piece rupture disc assembly, where the inlet, outlet, and rupture disc are separate pieces.

Figure 7:
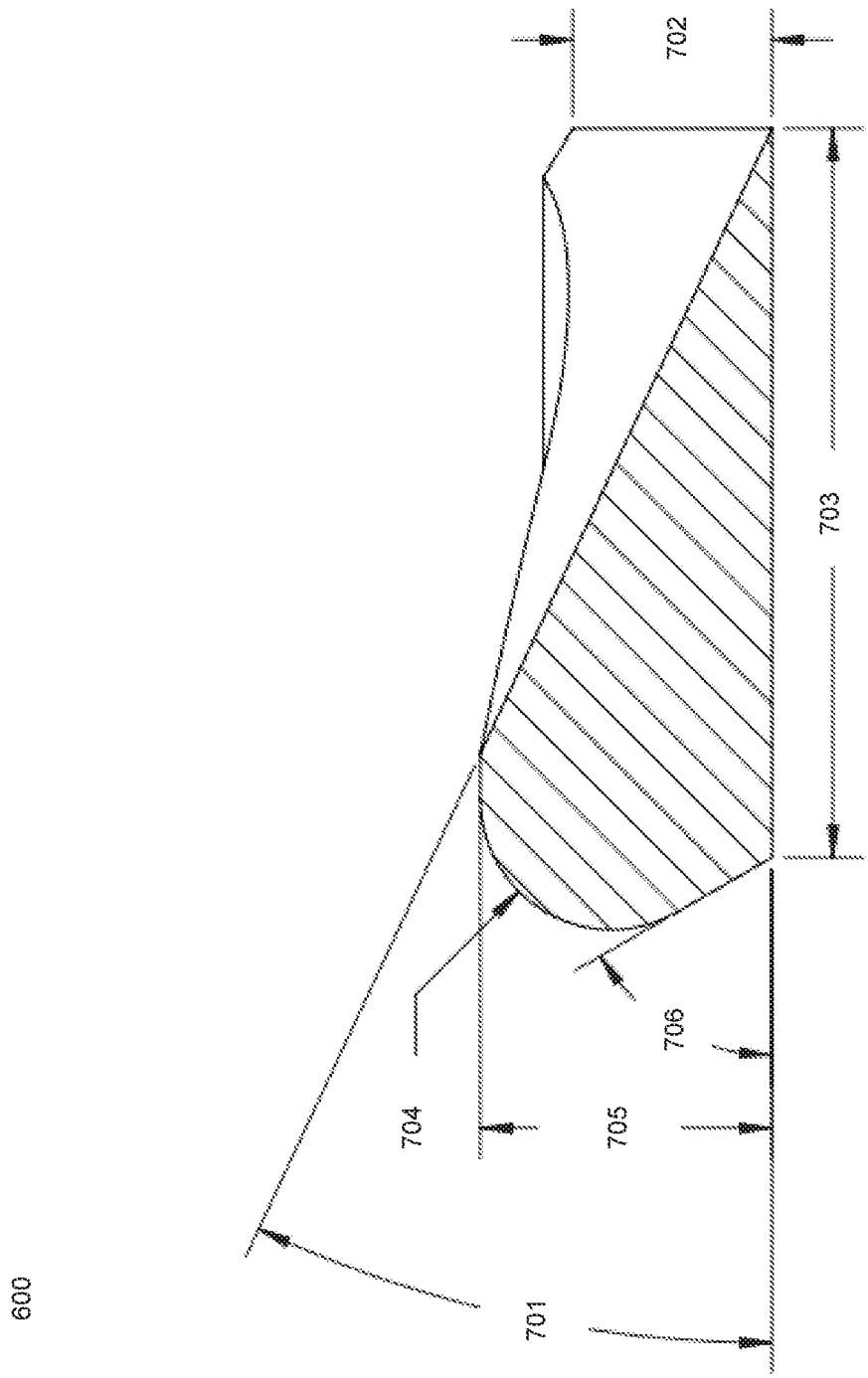
FIGS. 7-10 show a knuckle according to some embodiments of the present disclosure.

FIGS. 7-10 show an example knuckle 600 according to some embodiments of the present disclosure. In FIG. 7, which is a side cross-section of the knuckle 600, various measurements are shown. The knuckle 600 can include a draft angle 701 (see draft angle 605) of about 25 degrees, a height 702 of 0.27 inches, a length 703 of 1.00 inches (this length borders the inner diameter of the outlet holder 606), a nose radius 704 that is approximately 14-15% of the inner radius of the outlet holder, an overall height 705 of 0.4 inches, and an angle 706 from the inner diameter of 60 degrees. In some embodiments, a 1" knuckle nose radius is about 0.10 inches and the radius of the outlet bore is about 0.688 inches and this ratio can be applied to various sizes.

Figure 8:
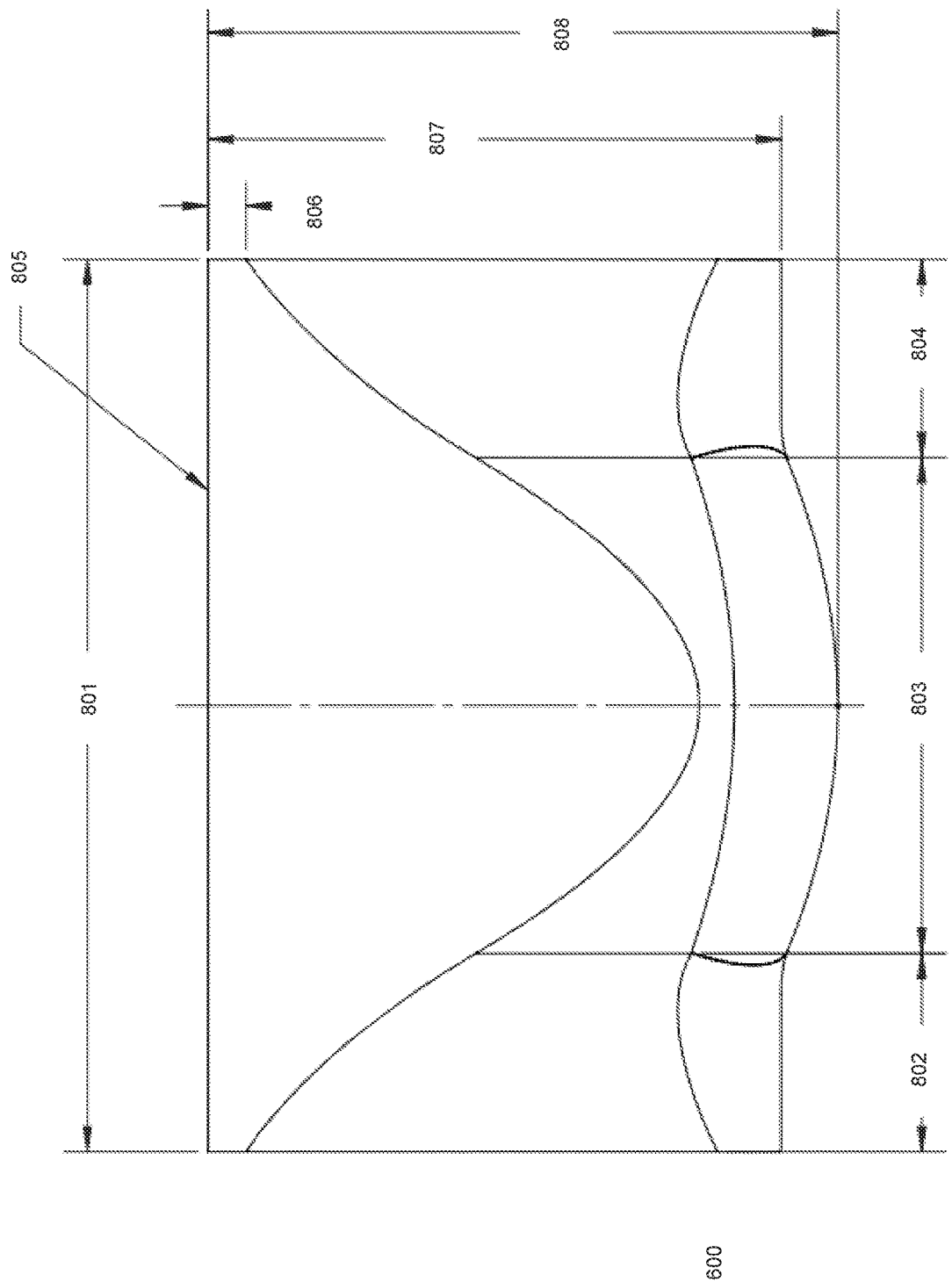

In FIG. 8, the example knuckle 600 includes an overall length 801 of 1.56 inches, a left wing 602 length 802 of 0.35 inches, a right wing 602 length 804 of 0.35 inches, a crown 601 length 803 of 0.87 inches, an edge thickness 805 of 0.04 inches, and various widths 806-808 of 0.07 inches, 1.00 inches, and 1.10 inches.

Figure 9:
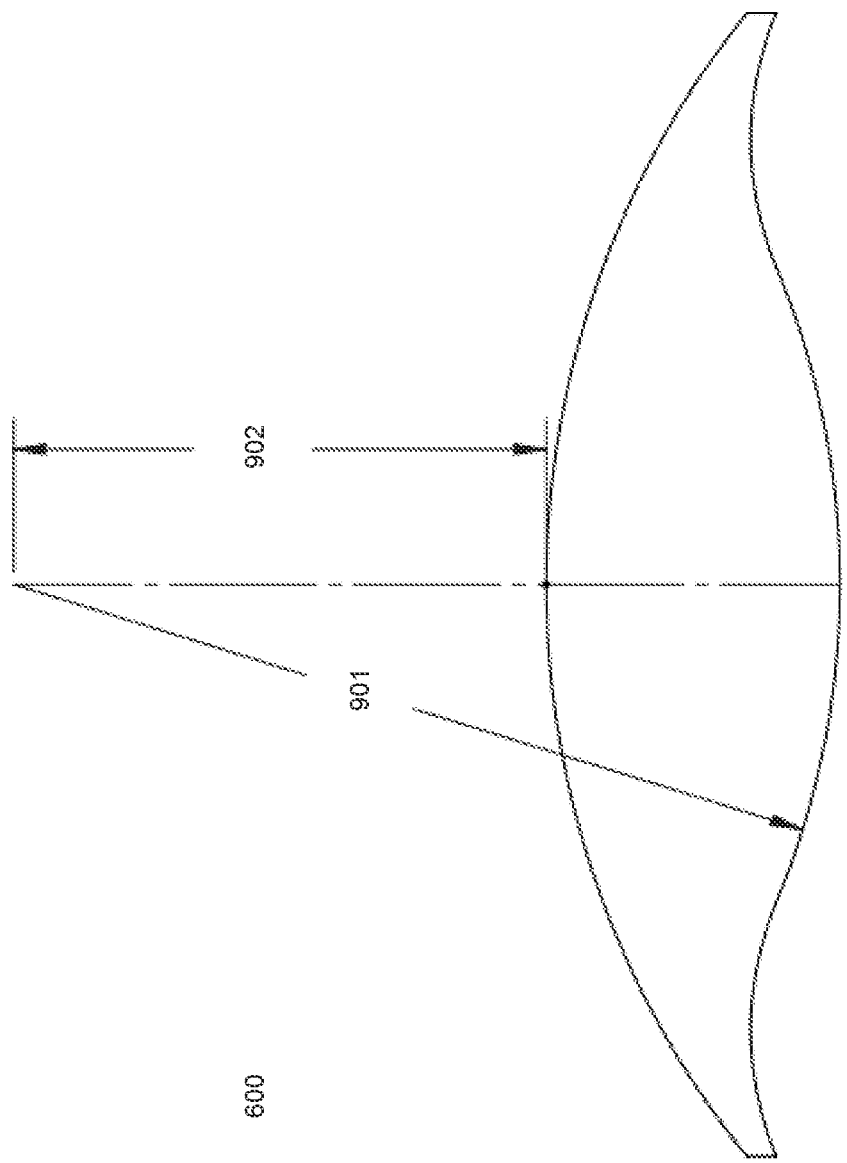

In FIG. 9, the knuckle 600 includes a radius 901 of the crown 601 that is about 112.5% of the inner radius of the outlet holder 606 and a distance 902 from the center of the crown radius's circle center of 0.73 inches.

Figure 10:
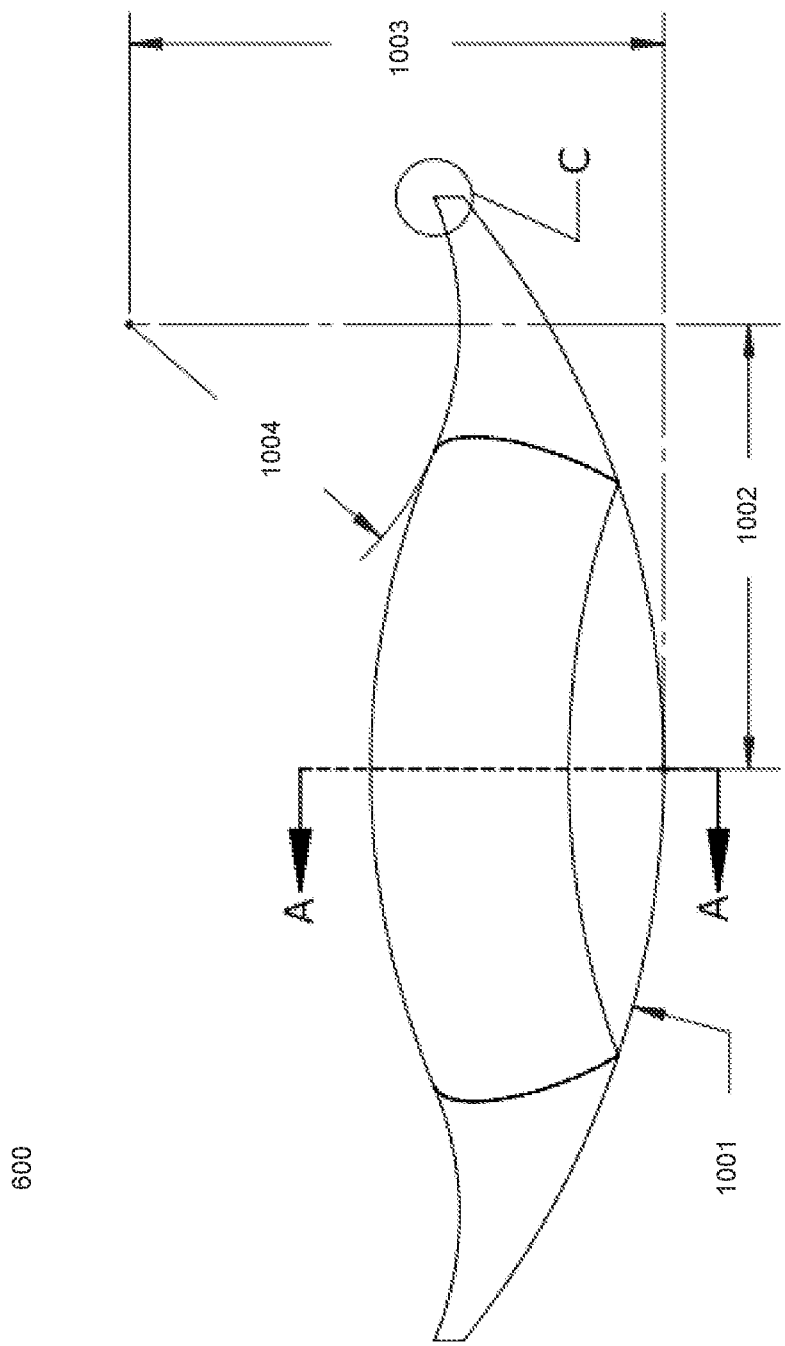

In FIG. 10, the knuckle 600 includes a radius 1001 that is 125% of the inner radius of the outlet holder 606, a distance 1002 from the midpoint of the knuckle 600 to the midpoint of the wing 602 of about 0.61 inches, a distance 1003 from the center of the crown radius's circle center of 0.73 inches, and a distance 1004 from the center of the crown radius's circle center to the wing 602 of 45% of the inner radius of the outlet holder 606.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:
1. A rupture disc assembly comprising:
an inlet body;

an outlet body in contact with the inlet body and forming a throughbore with an inner diameter, the outlet body comprising a first plane in contact with the inlet body and a second plane opposite the first plane;

a rupture disc residing within and sealing the throughbore; and a knuckle on the outlet body residing within the throughbore, protruding past the first plane toward the rupture disc, and configured to catch the rupture disc upon activation, the knuckle comprising:
- a crown with a crown radius facing the throughbore; and
- a curved wing on each side of the crown;
- wherein a backside of the knuckle reduces from the inner diameter at a draft angle.

2. The rupture disc assembly of claim 1, wherein the inlet body, the outlet body, and the rupture disc are separate pieces.

3. The rupture disc assembly of claim 1, wherein the inlet body and the rupture disc are welded together.

4. The rupture disc assembly of claim 1, wherein the inlet body, the outlet body, and the rupture disc are welded into a single unit.

5. The rupture disc assembly of claim 1, wherein the crown radius is proportional to the inner diameter of the throughbore.

6. The rupture disc assembly of claim 5, wherein a ratio of the crown radius to the inner diameter is approximately 1:0.90 to 1:1.10.

7. The rupture disc assembly of claim 1, wherein each curved wing comprises a wing radius.

8. The rupture disc assembly of claim 1, wherein the knuckle comprises a nose radius perpendicular to the crown radius.

9. The rupture disc assembly of claim 1, wherein the knuckle protrudes past the first plane according to a nose angle proportional to a height of the crown.

10. The rupture disc assembly of claim 9, wherein the nose angle is proportional to the height of the crown at a ratio of about 1:2.

11. The rupture disc assembly of claim 1, wherein the draft angle is proportional to a height of the crown.

12. The rupture disc assembly of claim 1, wherein the wings are configured to cause the rupture disc to curl into a shape of the throughbore prior to colliding with the backside of the knuckle.

13. A rupture disc assembly comprising:

an inlet body;

an outlet body in contact with the inlet body and forming a throughbore with an inner diameter, the outlet body comprising a first plane in contact with the inlet body and a second plane opposite the first plane;

a rupture disc residing within and sealing the throughbore, wherein the inlet body and the rupture disc are welded together to form a single piece; and a knuckle on the outlet body residing within the throughbore, protruding past the first plane toward the rupture disc, and configured to catch the rupture disc upon activation, the knuckle comprising:
- a crown with a crown radius facing the throughbore; and
- a curved wing on each side of the crown;
- wherein a backside of the knuckle reduces from the inner diameter at a draft angle.

14. The rupture disc assembly of claim 13, wherein the crown radius is proportional to the inner diameter of the throughbore.

15. A rupture disc assembly comprising:

an inlet body;

an outlet body in contact with the inlet body and forming a throughbore with an inner diameter, the outlet body comprising a first plane in contact with the inlet body and a second plane opposite the first plane, wherein the outlet body comprises an asymmetric keyed extension;

a rupture disc residing within and sealing the throughbore; and a knuckle on the outlet body residing within the throughbore, protruding past the first plane toward the rupture disc, and configured to catch the rupture disc upon activation, the knuckle comprising:
- a crown with a crown radius facing the throughbore; and
- a curved wing on each side of the crown;
- wherein a backside of the knuckle reduces from the inner diameter at a draft angle.

16. The rupture disc assembly of claim 15, wherein the crown radius is proportional to the inner diameter of the throughbore.

* * * * *